(12) United States Patent
Pieterse et al.

(10) Patent No.: US 7,459,135 B2
(45) Date of Patent: Dec. 2, 2008

(54) METHOD FOR THE REMOVAL OF $NO_X$ AND CATALYST THEREFOR

(75) Inventors: Johannis Alousius Zacharias Pieterse, Alkmaar (NL); Rudolf Willem Van Den Brink, Amsterdam (NL)

(73) Assignee: Stichting Energieonderzoek Centrum Nederland, Le Petten (NL)

( * ) Notice: Subject to any disclaimer, the term of this patent is extended or adjusted under 35 U.S.C. 154(b) by 245 days.

(21) Appl. No.: 10/521,737

(22) PCT Filed: Jul. 18, 2003

(86) PCT No.: PCT/NL03/00532

§ 371 (c)(1),
(2), (4) Date: Sep. 20, 2005

(87) PCT Pub. No.: WO2004/009220

PCT Pub. Date: Jan. 29, 2004

(65) Prior Publication Data

US 2006/0105902 A1   May 18, 2006

(30) Foreign Application Priority Data

Jul. 19, 2002   (NL) .................................... 1021116

(51) Int. Cl.
*B01D 53/56* (2006.01)
*B01D 53/72* (2006.01)
*B01J 29/00* (2006.01)
*B01J 29/068* (2006.01)
*B01J 37/00* (2006.01)

(52) U.S. Cl. .............. 423/239.1; 423/239.2; 423/245.3; 502/73; 502/74; 502/300; 502/302; 502/305; 502/324; 502/325; 502/349; 502/353; 502/355

(58) Field of Classification Search .............. 423/213.2, 423/213.5, 213.7, 239.1, 239.2, 245.3; 502/302, 502/325, 355, 349, 353, 305, 324, 300, 73, 502/74

See application file for complete search history.

(56) References Cited

U.S. PATENT DOCUMENTS

| 5,494,878 A | * | 2/1996 | Murakami et al. | 502/304 |
| 5,811,067 A | * | 9/1998 | Lecuyer et al. | 423/239.2 |
| 6,063,351 A |   | 5/2000 | Hamon et al. |

FOREIGN PATENT DOCUMENTS

| JP | 05-115751 A | * | 5/1993 |
| JP | 07-323215 A | * | 12/1995 |
| JP | 08-164338 A | * | 6/1996 |
| JP | 09-192486 A | * | 7/1997 |

\* cited by examiner

*Primary Examiner*—Timothy C Vanoy
(74) *Attorney, Agent, or Firm*—Young & Thompson

(57) ABSTRACT

The invention relates to a method for the catalytic reduction of $NO_x$ in an $NO_x$ containing gas using methane in the presence of a catalyst which comprises a palladium-containing zeolite. In this process one uses a zeolite based on rings of 12 oxygen atoms, wherein the zeolite also comprises scandium, yttrium, a lanthanide or a combination thereof. The invention also relates to the catalyst itself and the preparation thereof.

39 Claims, 4 Drawing Sheets

Fig 1

Effect of method of preparation (0.4 % by wt Pd)

NOx conversion

Fig 4

Stability of Ce(IMP)-Pd(WIE)-MOR

METHOD FOR THE REMOVAL OF NO$_X$ AND CATALYST THEREFOR

FIELD OF INVENTION

The invention relates to a method for the catalytic reduction of NO$_x$ in an NO$_x$ containing gas using methane in the presence of a catalyst which comprises a palladium-containing zeolite. The invention also relates to a catalyst which comprises a palladium-containing zeolite. The invention also relates to the preparation of this catalyst.

BACKGROUND OF INVENTION

NO$_x$ is released in combustion processes in, for example, gas engines. At present only very few gas engines are equipped with a deNO$_x$ installation. Apart from NO$_x$, the exhaust gases of gas engines contain considerable amounts of uncombusted methane; sometimes up to 3% of the fuel leaves the engine uncombusted. These methane emissions must also be controlled as part of the reduction of greenhouse gas emissions.

NO$_x$ can also be released from gas burners in horticulture, generating sets, emergency power supplies, gas turbines of (small-scale) combined heat and power systems, and in the industrial production of, for example, cement, nitric aid, iron or caprolactam, in traffic and in the burning of household refuse.

There are various techniques on the market for reducing NO emmisions, such as low-NO$_x$ burners and selective catalytic reduction with ammonia or urea. These techniques, however, are impossible or expensive to apply for many (small-scale) (gas burner) installations which produce NO$_x$. There is therefore a demand for an inexpensive downstream technique for the reduction of NO$_x$.

U.S. Pat. Nos. 5,149,512 and 5,260,043 describe methods in which NO$_x$ is removed with the aid of methane and in which inter alia a catalyst is used which consists of a ZSM-5 zeolite loaded with cobalt. This catalyst, however, only has limited activity for the catalytic reduction of NO$_x$ with methane. In the absence of water, temperature above 450° C. are necessary for an NO$_x$ removal efficiency above 50%. In the presence of water, however, it must be expected that the NO$_x$ conversion will decrease by about half.

According to the review article by Traa et al., Co-ZSM-5 can also be used for the reduction of NO$_x$ with propane (Y. Traa, B. Burger, J. Weitkamp, Micr. Mes. Mater. 30 (1999) 3-41). It was found here that the method of preparation of the catalyst was critical, and that much higher activities were obtained if the zeolite was loaded with cobalt by the impregnation method (incipient wetness).

A much more efficient catalyst for the reduction of NO$_x$ with methane was found in the form of ZSM-5 with palladium. It is true that these zeolites have a higher activity than zeolites based on cobalt, but it turns out that the activity of the Pd zeolite catalyst also decreases greatly in the presence of water. Loss of activity is also clearly observed as a function of time, (see for example Y. Traa, B. Burger, J. Weitkamp, Micr. Mes, Mater. 30 (1999) 3-41).

Ogura et al. (M. Ogura, S. Kage, M. Hayashi, M. Matsukate and E. Kikuchi, Appl. Catal. B 27 (2000), L213-216) describe the stabilization of Pd-ZSM-5 with the aid of inter alia cobalt, rhodium, silver, cerium or iron. It is apparent from his study that cobalt is highly suitable as a stabilizer. Cobalt might also have a promoting effect on the reaction (promotor). The other elements, rhodium, silver, cerium and iron, are promotors in the reaction and also provide Pd-ZSM-5 stabilization.

From FIG. 3 in this publication, however, it can be deduced that although these elements can have a stabilizing effect (the half-life increases), it also turns out that the initial conversion activity deceases, if loaded with rhodium the initial activity goes from 49.7% to 18.9% (drop of about 60%), with silver the initial activity goes from 49.7% to 29.9% (drop of about 40%), with cerium the initial activity goes from 49.7% to 39.6% (drop of about 20%) and with iron the initial activity goes from 49.7% to 40% (drop of about 20%). In a number of cases, this may mean that for a substantial part of its life the stabilized catalyst has a lower activity than the non-stabilized catalyst. That is not desirable. The fact that the initial conversions differ so much with the different metal combinations also makes it almost impossible here to check whether there is in fact any stabilizing effect at all.

Only for the Pd-ZSM-5 catalyst stabilized with cobalt (FIGS. 1 and 2 of this publication) does it appear to be true that the activity scarcely decreases as a result of the addition of (3.3% by weight) cobalt, while good stabilization is indeed obtained (in any case for a reaction time up to about 14 h). On the basis of this article the person skilled in the art would opt for a Pd—Co-ZSM-5 catalyst for the reduction of NO$_x$ using methane. The activity of this catalyst is limited, however: only 60% NO$_x$ conversion is achieved at 500° C.; the stability after about 14 h is not known.

In U.S. Pat. No. 6,063,351 a catalyst based on this palladium-cobalt pairing, with mordenite (MOR) as carrier, is described for the reduction of NO$_x$ with methane. This catalyst has markedly improved activity compared with the cobalt catalyst of the above-mentioned U.S. Pat. No. 5,149,512. Experimentally, however, the stability of this catalyst is found to be inadequate in the long term.

Japanese patent abstracts JP 09 192486, JP 08 164338 and JP 07 32325 also describe catalysts in which Pd may be present. However, none of these abstracts show or indicate that palladium should be present as an ion coordinated by a zeolite. In contrast, for example JP 08 164338 describes that Pd (oxide) layers are present on a zeolite, and JP 07 32325 describes that oxides are present on a γ-alumina substrate. The disadvantages of these catalysts are the same as the disadvantages of the other catalysts know from the art and described above.

SUMMARY OF INVENTION

It is therefore the object of this invention to find an efficient method for the catalytic reduction of NO$_x$ in an NO$_x$ containing gas using methane, with the aid of a suitable catalyst. It is furthermore an object of the present invention that this catalytic reduction shall also take place efficiently in the presence of water in the NO$_x$ comprising gas. It is also an object to find a catalyst with a high activity for the catalytic reduction of NO$_x$ and with a high stability.

Surprisingly it was found that a zeolite based on rings having 12 oxygen atoms also containing palladium ions, with the zeolite also containing scandium, yttrium, a lanthanide or a combination thereof, gives excellent results in the catalytic reduction of NO$_x$ with the aid of methane. In this way an inexpensive NO$_x$ reduction technique is obtained. Methane is relatively cheap and available almost everywhere from the natural gas network. The invention therefore relates to a method for the catalytic reduction of NO$_x$ in an NO$_x$ containing gas using methane in the presence of a catalyst which comprises a palladium-containing zeolite, characterized by using a zeolite based on rings having 12 oxygen atoms, wherein the zeolite also contains scandium, yttrium, a lanthanide or a combination thereof.

The invention also relates to this catalyst which comprises a palladium-containing zeolite, wherein the palladium in the zeolite is wholly or partially coordinated as ion by the zeolite, wherein the zeolite is based on rings of 12 oxygen atoms, and wherein the zeolite is also loaded with scandium, yttrium or a lanthanide or a combination thereof.

The invention also relates to a method for the preparation of such a catalyst, wherein the zeolite is loaded with scandium, yttrium, a lanthanide or a combination thereof and optionally other metals after having been loaded with palladium by ion exchange.

DESCRIPTION OF INVENTION

In the description of the invention $NO_x$ is defined as nitrogen oxides where x (or the O/N ratio) is greater than or equal to 1, such as NO, $NO_2$, $N_2O_3$ etc. $N_2O$, laughing gas, is not included in this definition. NO is usually in equilibrium with other nitrogen oxides, where x is greater than 1, and oxygen.

"Methane" or a "methane containing gas" means methane, but can also mean natural gas or another gas mixture containing methane and other gases. "Palladium-containing" means that palladium ions are present in the channels (pores) and/or cages of the zeolite. Lanthanides (Ln) are the elements 57 (La, lanthanum) to 71 (Lu, lutetium) inclusive. "Metal" or "element" means that the elements can be present as a metal, as a metal compound (notably oxides), but also as an ion of the element/metal.

The $NO_x$ containing gas can for example be the gas released by a gas engine or a gas burner, but can also be an exhaust gas from nitric acid synthesis. The gas can also contain oxygen and/or water. Unlike most catalysts according to the prior art, the catalyst according to the invention loses little or no activity in the presence of water. This is true in particular if the water is present in quantities up to about 5-15%, e.g. 12%, Oxygen can for example be present up to about 20%. The gas may also contain carbon monoxide (CO), that can be removed (partially or completely) by the catalyst of the invention. Hence, the invention is also directed to a method where a catalyst is also used for the removal of $NO_x$ and carbon monoxide, e.g., in exhausts of gas engines. CO may be present in amounts of e.g. 1-2000 ppm or more.

The invention encompasses a method for the catalytic reduction of $NO_x$ in an $NO_x$ containing gas using methane in the presence of a catalyst which comprises a palladium-containing zeolite, characterized by using a zeolite based on rings having 12 oxygen atoms, wherein the zeolite also contains scandium, yttrium, a lanthanide or a combination thereof. The invention is also direct to such catalyst. The palladium is brought into the zeolite by ion exchange, before other (active) metals are introduced into and/or onto the zeolite. The ion exchange step is important, as is also the order of introduction of the metals. Impregnation is generally a simple and cheaper method of putting metals into a carrier, and this method is often used for this reason (among others by Cordoba et al,: L. F. Cordoba, M. Flytzani-Stephanopoulos, C. Montes de Correa, Appl. Catal. B 33 (2001), 25-33).

Cordoba et al. (L. F. Cordoba, M. Flytzani-Stephanopoulos, C. Montes de Correa, Appl. Catal. B 33 (2001), 25-33) choose a method for the reduction of $NO_x$ in which a catalyst is used based on cerium-palladium-mordenite and $NO_x$ is reduced with the aid of dodecane as reducing medium. In this catalyst for this reaction, however, impregnated cerium is the active element and impregnated palladium the promotor.

If the catalyst according to Cordoba et al. is used for the reduction of $NO_x$ with methane, this is found to be inadequate: methane is partially combusted instead of reducing $NO_x$. If dodecane has to be used, the presence of PdO (present after impregnation and calcination) is flavourable for the combustion of coke precursors on the catalyst surface. The presence of PdO is found to be unwanted in the case of methane, however: methane is oxidized and less reaction with $NO_x$ can then take place. The palladium must therefore be brought into the zeolite by ion exchange, so that the palladium ion (especially as $Pd^{2+}$), wholly or partially coordinated by the zeolite lattice, and not as PdO, is present in the zeolite lattice. For palladium it is surprisingly found that it is important for the method of the present invention that palladium is introduced by ion exchange. Therefore, the zeolite is loaded with scandium, yttrium, a lanthanide or a combination thereof and optionally other metals after having been loaded with palladium by ion exchange.

The expression 'wholly or partially coordinated by the zeolite' means that the palladium has been introduced by ion exchange, and the palladium as ion ($Pd^{2+}$ for example) is exchanged for cations especially in the pores which (via oxygen) are associated with aluminium. The palladium ion is therefore exchanged for at least 1 cation of the zeolite and is thus coordinated by the zeolite. The palladium can also be coordinated by an anion from the solution (which has been used for the exchange), but can also be exchanged with a second cation from the pores. In this way the palladium is then completely coordinated by the zeolite and the palladium is in any case after ion exchange substantially present as an ion and not as palladium oxide. Palladium may have been exchanged with $H^+$ and $NH_4^+$, for example. The exchange will take place particularly in the pores. The zeolite is preferably loaded with 0.02 to 2% by weight of palladium. Here, "% by weight" refers to the amount of zeolite exchanged with palladium.

The fact that palladium is present as an ion can also be determined with the aid of IR measurements (FTIR). A non-exchanged zeolite has a lattice vibration band at about 1050 $cm^{-1}$, whereas a zeolite exchanged with $Pd^{2+}$ has this band at about 950 $cm^{-1}$. Such a band at about 950 $cm^{-1}$ is also absent after impregnation, which means that Pd is not present as Pd-ions but as PdO, e.g. as PdO clusters. The catalyst of the present invention therefore comprises a zeolite exchanged with $Pd^{2+}$, with an absorption signal being found with FTIR at about 950 $cm^{-1}$, as a result of a zeolite lattice vibration. As described above, this zeolite, based on rings having 12 oxygen atoms, has been or is further loaded with scandium, yttrium or a lanthanide or a combination thereof.

The zeolite for the method for the catalytic reduction of $NO_x$ according to the invention, in which the palladium is introduced by ion exchange, belongs to the group of zeolites which contain 12-rings (12 O atoms). The term "12-ring" means that in the zeolite channels or pores are present which are constructed of rings of Si/Al and oxygen and in which 12 oxygen atoms are present. Surprisingly these zeolites are found to be much more satisfactory for the present method than zeolites based on 10-rings, for example, such as ZSM-5. The zeolite to be used according to the invention therefore comprises a zeolite wherein 12-rings are present, such as, for example, FAU, MOR, BRA, EMT, CON, BOG or ITQ-7, etc., or other zeolites based on 12-rings, which are known to the person skilled in the art, or combinations thereof, e.g. FAU and MOR. The silicon/aluminium ratio is preferably 2 or greater. Particularly good results are achieved when the zeolite is MOR.

Scandium, yttrium and/or one or more lanthanides are put in the zeolite as a stabilizing element. Examples of these elements are lanthanum, cerium, praseodymium, gadolinium, terbium, dysprosium, or combinations such as cerium and gadolinium, etc. Thee introduction can take place by ion exchange in the liquid phase, but the loading can also be obtained by pore volume impregnation (incipient wetness technique). Hence, the invention also comprises a method where the zeolite is loaded with scandium, yttrium, a lanthanide or a combination thereof by ion exchange or incipient wetness techniques. It is important that this step takes place after the introduction of the palladium ion. Surprisingly it is found that this combination of (a) a Pd zeolite based on rings having 12 oxygen atom, where (b) the zeolite also contains scandium, yttrium, a lanthanide or a combination thereof, gives excellent results in the present method for the catalytic reduction of $NO_x$ in an $NO_x$ containing gas using methane. The second element increases the stability and preferably furthermore increases the initial activity, even in the presence of water.

In another embodiment, the zeolite is loaded with scandium, yttrium, a lanthanide or a combination thereof by physically mixing the zeolite with salts or oxides of said metals. Also this method to obtain the catalyst provides good results for the method of the invention for the catalytic reduction of $NO_x$ with methane. Here, the term 'loaded' is used to indicate at the zeolite is physically mixed with salts or oxides of said metals (or combinations thereof). Mixing will mainly be done by dry mixing, but one may also add some liquid, to improve the mixing. In this embodiment, the catalyst of the invention comprises a mixture of a zeolite based on rings having 12 oxygen atoms, wherein the zeolite ion-exchanged with palladium and is further loaded with one or more salts and/or oxides of scandium, yttrium, a lanthanide or a combination thereof. When salts are used, they will usually be converted into oxides, e.g. during a pretreatment.

The invention further comprises a method for the catalytic reduction of $NO_x$ and a catalyst where the zeolite is loaded with one or more metals from groups IIIa, IIIb, IVa, IVb, Vb, VIb, VIIb, and VIII of the periodic system (c), in addition to (a) palladium and (b) scandium, yttrium, a lanthanide or a combination thereof. For example, the zeolite may be loaded with manganese, vanadium, niobium, gallium, indium, titanium, hafnium or stannum, but the zeolite may also be loaded with germanium, lead, zirconium, tantalum, chromium, molybdenum, tungstun, rhenium, iron, ruthenium, osmium, cobalt rhodium, iridium, nickel, and platinum. Here the same applies as described above for scandium, yttrium, etc., viz. that the zeolite may be loaded by ion exchange, incipient wetness techniques or by physically mixing the zeolite with salts or oxides of said metals (see also below). Also combinations of these elements can be used, for example cobalt and platinum, or rhodium and molybdenum, manganese and cobalt, gallium and platinum, etc., or combinations of more than two metals from above-mentioned groups can be chosen. The zeolite may be loaded with 0-20% by weight with one or more metals from groups IIIa, IIIb, IVa, IVb, Vb, VIb, VIIb, and VIII of the periodic system (c). Here, "% by weight" refers to the amount of zeolite exchanged with palladium (a) and loaded with oxides or salts (or both) of the metals from Sc, Y or a Ln (b) as well as the metal(s) from Group VIII of the periodic system (c).

The invention also encompasses in one embodiment a method for the catalytic reduction of $NO_x$ and a catalyst where the zeolite is also loaded with 0.01-2% by weight of a second metal from Group VIII of the periodic system, in addition to palladium. Here, "% by weight" refers to the amount of zeolite exchanged with palladium (a) and loaded with the metal(s) as oxide(s) or salt(s) of Sc, Y or a Ln (b) and the second metal from group VIII of the periodic system (c). Examples of such a metals are cobalt and platinum.

The present invention also encompasses a catalyst as described above.

The process conditions for the catalytic reduction of $NO_x$ will depend on the applications. The person skilled in the art will therefore choose the catalyst volume, the gas speed, the temperature, the pressure and the quantity of methane (or natural gas), and the composition of the gas, in such a way that the best conversion results are achieved. Good results are achieved, for example, at an NO content of about 100 ppm or more. It is possible to work with an excess of methane. The $NO_x$/methane ratio is preferably between about 0.02 and 2.

The method can be used at relatively low temperatures. The conversion of $NO_x$ takes place from about 300° C. onwards. Almost complete conversion takes place at about 450° C., At higher temperatures the conversion may decrease somewhat, but good results are still achieved at 500° C. The temperature for working is preferably between 300° C. and 600° C., more preferably between 350° C. and 450° C.

The method according to the invention can inter alia be used for the catalytic reduction of $NO_x$ which for example is emitted by gas engines, gas burners or emergency power supplies, or $NO_x$ which is emitted during caprolactam production, etc.

Thus, gas burners are for example used in horticulture for $CO_2$ fertilization in greenhouses. A trace of $NO_x$ can already impede the growth of the plants. In generating sets for emergency power supplies, use is usually made of diesel as fuel. In order to remove $NO_x$, according to the invention the reducing agent methane can be obtained from the natural gas network. In small-scale combined heat and power installations, gas turbines are also used in addition to gas engines. In the case of these turbines, too, $NO_x$ has to be removed from the outlet gases. The technique which makes use of natural gas as the reducing agent (instead of ammonia) is highly suitable for this purpose.

The method according to the invention can also be used in combination with a catalyst for the removal of $N_2O$, so that both $NO_x$ and $N_2O$ (laughing gas), which are emitted in the industrial production of nitric acid for example, are removed. A preferred embodiment of this comprises the method of the invention in combination with the catalyst for the removal of $N_2O$, wherein the latter is an iron-containing zeolite and/or a promoted iron-containing zeolite. In this process a gas containing nitrogen oxide ($NO_x$) and dinitrogen oxide ($N_2O$) is passed with methane through a first catalyst, as described above, and the gas obtained is then passed through an additional catalyst, where this additional catalyst comprises an iron-containing zeolite and/or a promoted iron-containing zeolite. The term "promoted" means that in addition to an active element, such as iron, the catalyst contains at least one additional element which promotes the reaction. Fe-ZSM-5 or Fe-MOR, for example, can be chosen as additional catalyst. The term "additional catalyst" refers to any extra catalyst, next to the catalyst of the invention. The person skilled in the art may also use a combination of additional catalysts.

$NO_x$ and $N_2O$ are also emitted in the production of caprolactam, a nylon precursor. The method described above of catalytic reduction of a gas containing nitrogen oxides and dinitrogen oxide with methane and the catalyst combination can also be used here.

The method according to the invention, as described above, can also be combined with other catalysts, e.g., catalysts for the removal of methane (such as PdO- or PtO-borne catalysts or example). Such a catalyst can be used to burn any methane left over after the catalytic reduction. The invention therefore also encompasses a method wherein an additional catalyst is used for the removal of methane, for example the combination of Ce—Pd-MOR and a PdO- or PtO-borne catalyst, or for example the combination of Ce—Pd-MOR, Fe-MOR and a PdO- or PtO-borne catalyst.

The present invention also encompasses a method for the preparation of a catalyst which is suitable for the catalytic reduction of $NO_x$ from an $NO_x$ containing gas using methane, as described above. In this method the zeolite is loaded with scandium, yttrium, a lanthanide or a combination thereof (and optionally other metals) after having been loaded with palladium by ion exchange (with the aid of a palladium salt in the liquid phase).

As mentioned above, the zeolite is loaded with scandium, yttrium, a lanthanide or a combination thereof by ion exchange, incipient wetness techniques or by physically mixing the zeolite with salts or oxides of these metals. The zeolite may be loaded with 0.01 to 50% by weight of these elements (present as oxide, salt or as ion). The person skilled in the art may choose the appropriate amounts of the metals. Here, "% by weight" refers to the amount of zeolite exchanged with palladium (a) and loaded with the metal(s) as oxide(s) or salt(s) of Sc, Y or a Ln (b).

When physical mixing is used to load the zeolite, the zeolite may usually be loaded with 0.01 to 50% by weight of scandium, yttrium, a lanthanide or a combination thereof. When ion exchange or incipient wetness techniques are used, the zeolite may usually comprise 0.01 to 20% by weight of scandium, yttrium, a lanthanide or a combination thereof. In a further embodiment, the zeolite is e.g. loaded with 0.01 to 20% by weight of these elements, more preferably with 1-10% by weight.

In a further embodiment of the method for the preparation of the catalyst according to the invention, a method may be used, where the zeolite, after having been loaded with palladium by ion exchange, the zeolite is optionally loaded with one or more metals from groups IIIa, IIIb, IVa, IVb, Vb, VIb, VIIb, and VIII of the periodic system, in addition to (a) palladium and (b) scandium, yttrium, a lanthanide or a combination thereof, before, at the same time or after the introduction of scandium, yttrium or a lanthanide or a combination thereof. The loading of the catalyst according to the invention with these metals can be done by ion exchange, incipient wetness techniques or by physically mixing the zeolite with salts or oxides of said metals. For example when using incipient wetness techniques, after the palladium exchange the zeolite can be loaded with 0.01 to 20%, e.g. 0.01-2% by weight of a second metal from Group VIII of the periodic system, in addition to palladium, before, during or after the introduction of scandium, yttrium and/or lanthanide in the zeolite.

Known salts such as readily soluble nitrates, for example, are used for the palladium exchange. The H or $NH_4$ form of the zeolite, such as for example $NH_4$-MOR or H-FAU, etc., can for example be used as the zeolite. The exchange is performed long enough (or often enough) for about 0.02 to 2% by weight of palladium to be present in the zeolite. The zeolite is then filtered off, washed and dried. After that the zeolite is loaded with scandium, yttrium, a lanthanide or a combination thereof. This can be done by ion exchange or by pore volume impregnation (incipient wetness technique). After that the zeolite is dried and calcined. It can also be done by a physical mixing (see above).

Hence, the catalyst of the invention comprises a palladium-containing zeolite, wherein the palladium in the zeolite is wholly or partially coordinated as ion by the zeolite, wherein the zeolite is based on rings of 12 oxygen atoms, and wherein the zeolite is also loaded with scandium, yttrium or a lanthanide or a combination thereof, and wherein the zeolite is optionally also loaded with (c) one or more metals from groups IIIa, IIIb, IVa, IVb, Vb, VIb, VIIb, and VIII of the periodic system. This catalyst may be prepared and used in various embodiments, as shown in the table below:

| | Pd ion | scandium, yttrium or a lanthanide or a combination thereof | optionally one or more metals from groups IIIa, IIIb, IVa, IVb, Vb VIb, VIIb, and VIII of the periodic system |
|---|---|---|---|
| via ion exchange of the zeolite | X | X | X |
| via incipient wetness techniques | — | X | X |
| via physically mixing of the zeolite with a salt or oxide | — | X | X |

One may also use a combination of methods, e.g. impregnating a Pd-exchanged zeolite with scandium, yttrium or a lanthanide or a combination thereof, and then further physically mixing with an oxide one of these metals.

Instead of physically mixing, or next to physically mixing, one may also use combinations of catalysts, e.g. a combination of catalysts where the catalysts are arranged in series. For example, the invention comprises also a method and a catalyst where the catalyst comprises a combination of (cat 1 (a)) a palladium-containing zeolite and (cat 2 (b)) an oxide of scandium, yttrium or a lanthanide or a combination thereof, in which the catalysts (cat 1 (a) and cat 2 (b)) are arranged in series. In another embodiment the invention comprises a method and a catalyst where the catalyst comprises a combination of a palladium-containing zeolite which has been loaded with scandium, yttrium or a lanthanide or a combination thereof by incipient wetness techniques (after the ion exchange with palladium) (cat 1(a,b) and an oxide of one or more metals from groups IIIa, IIIb, IVa, IVb, Vb, VIb, VIIb, and VIII of the periodic system (cat 2 (c)), in which the catalysts (1 (a,b) and 2 (c)) are arranged in series.

Here, the phrase "loaded with one or more metals from groups IIIa, IIIb, IVa, IVb, Vb, VIb, VIIb, and VIII of the periodic system, in addition to (a) palladium and (b) scandium, yttrium, a lanthanide or a combination thereof" describes that the zeolite is exchanged with palladium ions (a) and further loaded scandium, yttrium, a lanthanide or a combination thereof (b), either by ion-exchange, incipient wetness techniques or physical mixing with oxides or salts and also loaded with (c) one or more metals from groups IIIa, IIIb, IVa, IVb, Vb, VIb, VIIb, and VIII of the periodic system (either by ion-exchange, incipient wetness techniques or physical mixing with oxides or salts). The loading of the zeolite by palladium ions is always the first step. Then the same time or after each other, the zeolite is loaded with one of the other metals (b,c). Since Pd should be exchanged first, "loaded with one or more metals from groups IIIa, IIIb, IVa, IVb, Vb, VIb, VIIb, and VIII of the periodic system in addition to palladium" means "loaded with one or more metals from groups IIIa, IIIb, IVa, IVb, Vb, VIb, VIIb, and VIII of the periodic system, with the exception of Pd. However, when a method is used, wherein an additional catalyst is used for the removal of methane, Pd may be comprised as additional catalyst, which will be positioned in series after the catalyst of the invention (see also above). The catalyst of the invention comprises a palladium exchanged zeolite that is subsequently loaded with scandium, yttrium, a lanthanide or a combination thereof (b), either by ion-exchange, incipient wetness techniques or physical mixing (see above). Therefore, the phrase "loaded with one or more metals from groups IIIb, of the periodic system in addition to (b) scandium, yttrium, a lanthanide or a combination thereof" means that the catalyst of the invention comprises a zeolite that is "loaded with one or more metals chosen from the group consisting of scandium, yttrium, and lanthanides (La and Lu inclusive) (b) and may optionally be loaded with one or more metals from group IIIb (belonging to (c)), wherein in the case of a loading with the same loading techniques the metals chosen from group (b) and group (c) will usually be different, and wherein in the case of a loading with the different loading techniques the metals chosen from group (b) and group (c) may be the same or may be different". Examples of loading with the same techniques are e.g. ion-exchange for metals chosen from (b) and ion-exchange for metals chosen from (c); or a physical mixing for metals chosen from (b) and a physical mixing for metals chosen from (c). For example, a zeolite is exchanged with palladium and then impregnated with cerium. The cerium-palladium zeolite may then physically be mixed with cerium oxide.

The invention is also directed to a catalyst that is obtainable according to method for the preparation of the catalyst of the invention.

DESCRIPTION OF THE FIGURES

FIG. 6: Conversions as a function of the temperature of a combined $deNO_x/deN_2O$ setup where the gas is first passed through catalyst 2 and then through catalyst 6. Methane is taken as the reducing agent; the gas stream is characteristic of the emissions of a nitric acid factory.

EXAMPLES

Test Apparatus:

The catalytic conversion of NO, $NO_2$ (and possibly $N_2O$) with methane was studied in a semi-automatic test setup. Gases are supplied with so-called Mass Flow Controllers (MFC) and water is added by means of a saturator which has been set at the right temperature. Pipes are heated to 130° C. in order to prevent condensation. A quartz reactor with an internal diameter of 0.6 to 1 cm is placed in an oven for the experiments. The catalyst sieve fraction (0.5-0.5 mm) is placed on a quartz gauze. Quantitative analysis of the gaseous phase is possible using a calibrated Bomen MB100 Fourier transform infra-red (FTIR) spectrometer equipped with a model 9100 gas analyser. The carrier gas (balance) in the examples is $N_2$.

Example 1

Preparation of Loaded Zeolites

Cat 1: Palladium-MOR (Pd-WIE)

Pd-MOR was prepared by ion exchange. $NH_4$-MOR powder (Zeolyst, CBV21a) was stirred for 24 h, at 80° C., in a 10% by weight $Pd(NO_3)_2$ in nitric acid (Aldrich, 10%) solution. After that the zeolite was filtered off, thoroughly washed with demineralized water and dried for 16 h at 80° C. (Pd(WIE)-MOR; here WIE stands for 'obtained with ion exchange').

Cat 2: Cerium-Palladium-MOR (Ce-IMP; Pd-WIE)

For the preparation of 4% by wt Ce(IMP)-4% by wt Pd(WIE)-MOR 5 gram of 0.4% by weight Pd(WIE)-MOR was then taken and 1 ml of cerium nitrate (Aldrich) was added to it with a density of 1.44 grams per ml. The pores were precisely filled with this quantity (incipient wetness). The impregnated zeolite was then dried for 16 h at 80° C. and after that calcined the reactor at 450° C.

Cat 3: Palladium MOR (Pd(IMP))

For the preparation of 0.4% by wt Pd(IMP)-MOR 5 grams of $NH_4MOR$ was taken and 0.45 grams of 10% $Pd(NO_3)_3$ in 10% nitric acid was added to it. The impregnated zeolite was then dried for 16 h at 80° C. and after that calcined in the reactor at 450° C. (PdIMP means impregnated with Pd).

Cat 4: Cobalt-Palladium MOR (Co(IMP)-Pd(WIE))

For the preparation of 2.3% by wt Co(IMP)-0.4% by wt Pd(WIE)-MOR 5 grams of Pd(WIE)-MOR was taken and 1 ml of cobalt nitrate (Aldrich) was added to it with a density of 1.38 grams per ml. The impregnated zeolite was then dried for 16 h at 80° C. and after that calcined in the reactor at 450° C.

Cat 5: Cerium-MOR (Ce-IMP)

For the preparation of 4% by wt Ce(IMP)-MOR 5 grams of $NH_4$-MOR was taken and 1 ml of cerium nitrate (Aldrich) was added to it with a density of 1.44 grams per ml. The pores were precisely filled with this quantity (incipient wetness). The impregnated zeolite was then dried for 16 h at 80° C. and after that calcined in the reactor at 450° C.

Cat 6: Fe-ZSM-5

This catalyst was prepared by the method of preparation described in NL-A-1017245.

Cat 7: Praseodimium-Palladium-MOR (Pr-IMP; Pd-WIE)

For the Pr—Pd combination catalysts, 1 ml of praseodymiumnitrate (9.375 gram dissolved in 10 ml demiwater) was added to 5 gram of Pd-MOR (Cat 1). In this case the pores of the zeolite were precisely filled (so-called "incipient wetness impregnation"). Finally, the catalyst was dried for 16 h at 120° C. and calcined at 450° C. in situ.

Cat8: Yttrium-Palladium-MOR (Pr-IMP; Pd-WIE)

For the Y—Pd combination catalysts, 1 ml of yttriumnitrate (11.5 gram dissolved in 10 ml demiwater) was added to 5 gram of Pd-MOR (Cat 1). In this case the pores of the zeolite were precisely filled (so-called "incipient wetness impregnation"). Finally, the catalyst was dried for 16 h at 120° C. and calcined at 450° C. in situ.

Cat 9: Physical mixture of an a Ln oxide and Cerium-Palladium-MOR (Ce-IMP; Pd-WIE)

As oxide of a lanthanide ceria ($CeO_2$) was chosen. Cat 8 and ceria were physical mixed (3:1 w/w).

Cat 10:BEA Ce—Pd

This Catalyst was prepared in the same way as catalyst 2, but now using BEA as zeolite.

Cat 11:ZSM-5 Ce—Pd

This catalyst was prepared in the same way as catalyst 2, but now using ZSM-5 as zeolite.

Cat 12:FER Ce—Pd

This catalyst was prepared in the same way as catalyst 2, but now using FER as zeolite.

Example 2

Effect of Preparation

Catalyst 1 and catalyst 3 were measured under the following test conditions, as given in Table 1. The results obtained are given in Table 2 and in FIG. 1.

TABLE 1 test conditions for Example 2

| | |
|---|---|
| Volume | 0.9 ml |
| Flow | 150 ml/min |
| GHSV | 10000 $h^{-1}$ |
| P | 1 bara |
| Gas Composition: | |
| NO | 500 ppm |
| $CH_4$ | 2500 ppm |
| $H_2O$ | 5% |
| $O_2$ | 5% |
| $N_2$ | balance |

Figure 1:
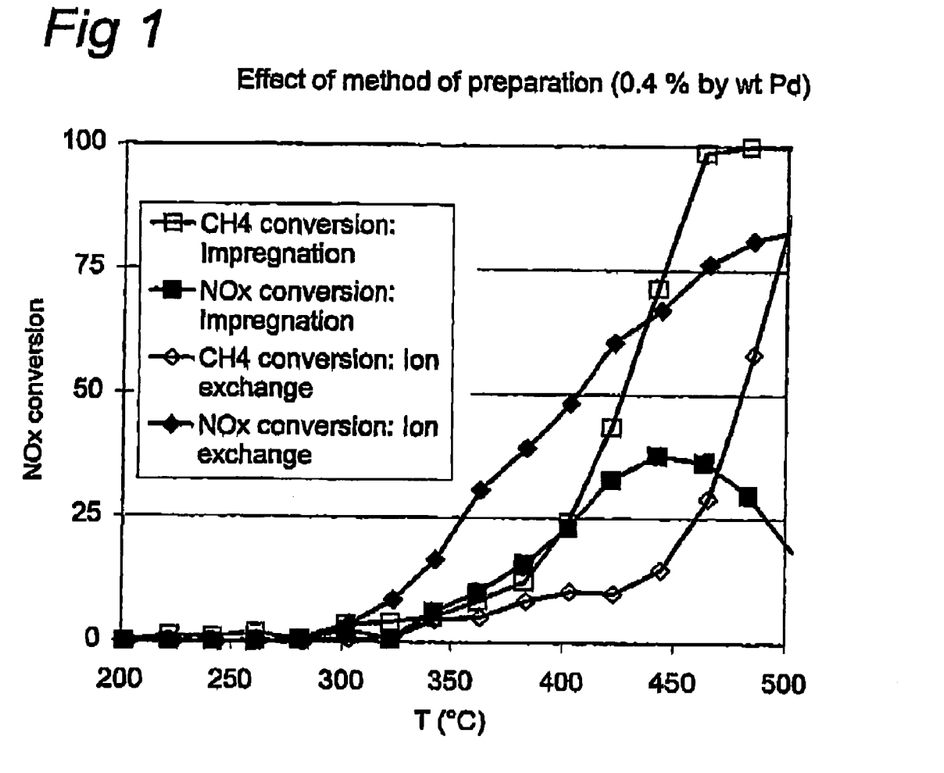
FIG. 1: $CH_4$ and $NO_x$ conversion over palladium-containing mordenite, wherein the mordenite is loaded with palladium by ion exchange (WIE) (Pd; catalyst 1) or impregnation (IMP) (Pd; catalyst 3).

TABLE 2 conversion results from Example 2 (see also FIG. 1)

| | Cat 3 | | Cat 1 | |
|---|---|---|---|---|
| T (° C.) | $CH_4$ conversion (%) | $NO_x$ conversion (%) | $CH_4$ conversion (%) | $NO_x$ conversion (%) |
| 202 | 0 | 0 | 0 | 0 |
| 222 | 1 | 0 | 0 | 0 |
| 242 | 1 | 0 | 0 | 0 |
| 261 | 2 | 0 | 0 | 0 |
| 281 | 1 | 0 | 1 | 0 |
| 302 | 4 | 3 | 1 | 4 |
| 322 | 4 | 1 | 1 | 9 |
| 342 | 5 | 6 | 5 | 17 |
| 362 | 8 | 10 | 5 | 31 |
| 382 | 12 | 16 | 8 | 39 |
| 402 | 24 | 23 | 10 | 48 |
| 422 | 43 | 33 | 10 | 61 |
| 443 | 71 | 38 | 15 | 67 |
| 463 | 99 | 36 | 29 | 76 |
| 483 | 100 | 30 | 58 | 81 |
| 503 | 100 | 19 | 91 | 83 |

From these data it is apparent that the Pd-impregnated catalyst (cat 3) burns methane, at the cost of the $NO_x$ conversion. Such catalysts are therefore not suitable for the method of the invention.

Figure 2:
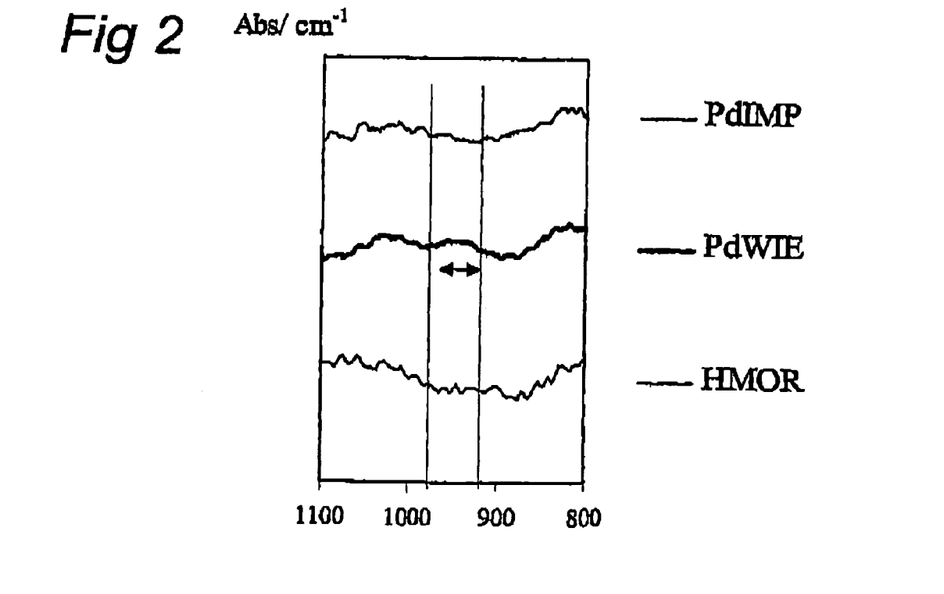
FIG. 2: FTIR absorption spectra of mordenite which has been impregnated with palladium (PdIMP) (Pd; catalyst 3), has been exchanged with palladium ions (PdWIE) (Pd; catalyst 1) and unloaded mordenite (HMOR).

FIG. 2 gives FTIR absorptions of mordenite which has been loaded with palladium by ion exchange or impregnation, and of non-exchanged mordenite. Only in the case of the zeolite exchanged with palladium is an absorption band present at about 950 $cm^{-1}$, which is characteristic of $Pd^{2+}$ at exchange sites.

Ion exchange with palladium results a shift of the lattice vibrational band ($\pm$1100-1000 $cm^{-1}$) towards lower wavenumber (between 980 and 920 $cm^{-1}$). As reported by e.g. L. Drozdova, R. Prins, J. Dedecek, Z. Sobalik, B. Wichterlova, J. Phys. Chem. B 106 (200) 2240 and B. Pommier, P. Gelin, Phys. Chem. Chem. Phys. 1 (1999) 1665, this is indicative for palladium cations co-ordinated at the exchange site positions inside the zeolite micropores. This band is absent in the SCR inactive HMOR sample before introduction of palladium and in the SCR inactive catalyst prepared by impregnation with palladium (PdIMP).

The interaction of $Pd^{2+}$ in the 12-membered ring channel of zeolite X and Y can also be shown by UV-VIS-NIR spectroscopy and $^{29}$Si-MAS NMR (Sauvage et al., J. Chem. Soc. Faraday Trans, 1995, 91(18), 3291-3297 and Sauvage et al. Chem. commun. 1996, 1325, respectively). However, also EXAFS may be used. For instance, Zhang and Sachtler describe in Zeolites Vol. 10, 1990 an EXAFS study that indicated the presence of $Pd^{2+}$ in the 12-membered ring of zeolite Y.

Example 3

Effect of Promotors

In this example catalyst 2 (cerium-palladium-MOR: Ce-IMP; Pd-WIE), catalyst 3 (palladium-MOR: Pd-WIE), catalyst 4 (cobalt-palladium-MOR: Co-IMP; Pd-WIE) and catalyst 6 (cerium-MOR: Ce-IMP) a compared. The test conditions are as shown in Table 3, the results are given in Table 4 and in FIG. 3.

TABLE 3 test conditions for Example 3

| | |
|---|---|
| Volume | 0.45 ml |
| Flow | 150 ml/min |
| GHSV | 20000 $h^{-1}$ |
| P | 1 bara |
| Gas composition: | |
| NO | 500 ppm |
| $CH_4$ | 2500 ppm |
| $H_2O$ | 5% |
| $O_2$ | 5% |
| $N_2$ | balance |

Figure 3:
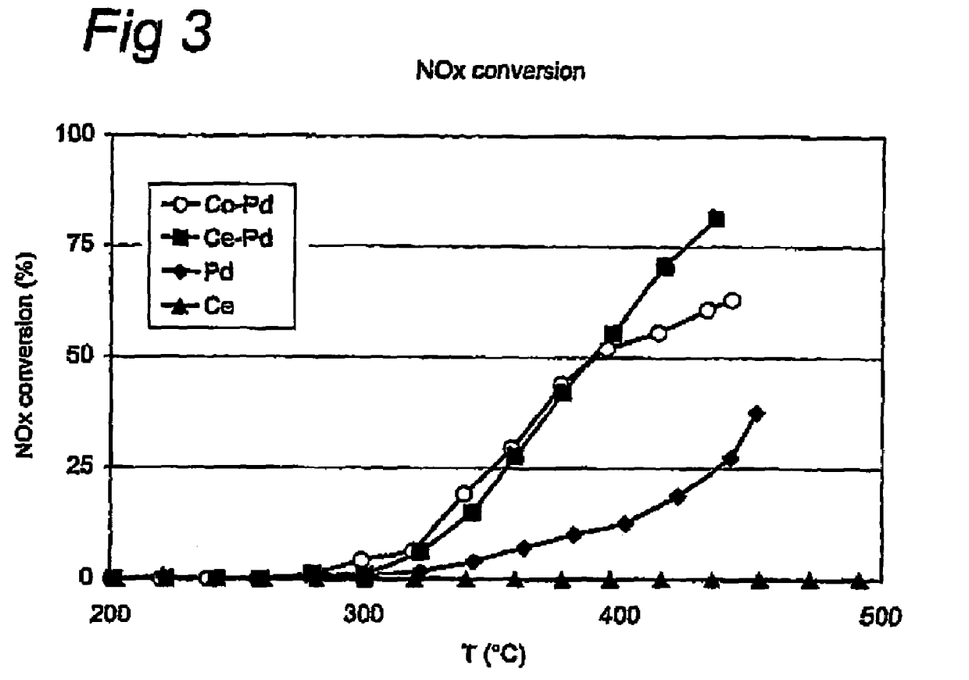
FIG. 3: $NO_x$ conversions over palladium exchanged mordenite (Pd; catalyst 1), cerium loaded mordenite (Ce; catalyst 5), cobalt-palladium loaded mordenite (Co—Pd; catalyst 4) and cerium-palladium loaded mordenite (Ce—Pd; catalyst 2).

TABLE 4 conversion results from Example 3 (see also FIG. 3)

| | $NO_x$ conversion (%) | | | |
|---|---|---|---|---|
| T (° C.) | Cat. 3 Pd | Cat. 6 Ce | Cat. 4 Co—Pd | Cat. 2 Ce—Pd |
| 200 | 0 | 0 | 0 | 0 |
| 220 | 0 | 0 | 0 | 0 |
| 240 | 0 | 0 | 0 | 0 |
| 260 | 0 | 0 | 0 | 0 |
| 280 | 0 | 0 | 1 | 1 |
| 300 | 1 | 0 | 4 | 1 |
| 320 | 2 | 0 | 6 | 6 |
| 340 | 4 | 0 | 19 | 15 |
| 360 | 7 | 0 | 29 | 28 |
| 380 | 10 | 0 | 44 | 42 |
| 400 | 13 | 0 | 52 | 55 |
| 420 | 19 | 0 | 56 | 71 |
| 440 | 28 | 0 | 61 | 82 |
| 450 | 38 | 0 | 63 | |
| 470 | | 0 | | |
| 490 | | 0 | | |

From the data it is apparent that both cerium and cobalt increase the activity of Pd-MOR. Above about 400° C. the conversion of the Ce—Pd-MOR catalyst is better. Ce-MOR does not show any activity at all, however, for the conversion of NO to $N_2$ with methane.

Example 4

Stability of Ce—Pd-MOR for Exhaust Gases from Internal Combustion Engines

In this example the stability of catalyst 2 is measured at different gas speeds and at different temperatures. The test conditions are given in Table 5, and the results of measurement are given in Table 6 (also comparison with catalyst 4 Co(IMP)-Pd(WIE)-MOR) and are reproduced in FIG. 4. The gas composition is characteristic of the composition of the exhaust gases from an internal combustion engine.

TABLE 5 test conditions for Example 4

| | |
|---|---|
| Volume | 0.45-1.8 ml |
| Flow | 150 ml/min |
| GHSV | 5000-20000 $h^{-1}$ |
| P | 1 bara |
| Gas composition: | |
| NO | 500 ppm |
| $CH_4$ | 2500 ppm |
| $H_2O$ | 5% |
| $O_2$ | 5% |
| $N_2$ | balance |

From the results below (Table 6, FIG. 4) it is apparent that in spite of the presence of 5% water (and 5% oxygen) the catalyst retains its activity at both temperatures. It is also apparent from the comparison of cat 2 (Ce(IMP)-Pd(WIE)-MOR) and cat 4 (Co(IMP)-Pd(WIE)-MOR) in Table 6 that the stability of cat 2 is higher.

Figure 4:
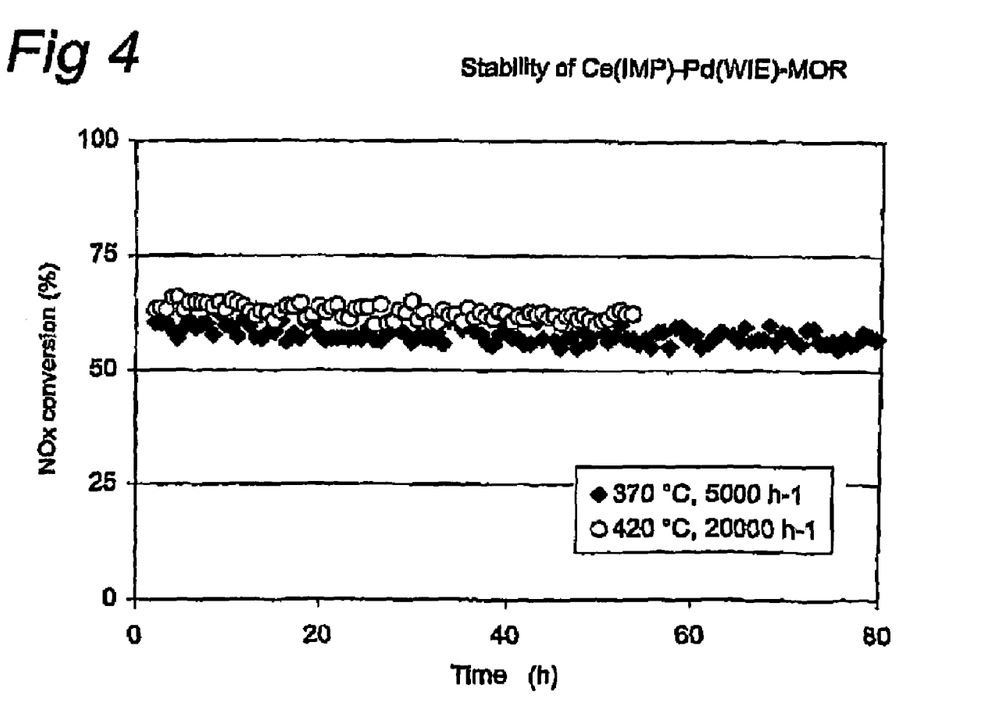
FIG. 4: $NO_x$ conversions over cerium-palladium loaded mordenite (catalyst 2) with methane as a function of time at different temperatures and gas speeds.

TABLE 6 conversion results from Example 4
(see also FIG. 4 for Ce—Pd-MOR)

| Time (h) | Ce(IMP)—Pd (WIE)-MOR T 370° C.; 5000 $h^{-1}$ | Ce(IMP)—Pd (WIE)-MOR T 420° C.; 20000 $h^{-1}$ | Ce(IMP)—Pd (WIE)-MOR T 420° C.; 20000 $h^{-1}$ |
|---|---|---|---|
| 2 | 61 | 63 | 56 |
| 5 | 59 | 63 | 58 |
| 10 | 60 | 63 | 60 |
| 15 | 58 | 61 | 56 |
| 20 | 58 | 63 | 56 |
| 25 | 59 | 64 | 54 |
| 30 | 57 | 63 | 53 |
| 35 | 60 | 61 | 53 |
| 40 | 57 | 62 | 51 |
| 45 | 57 | 62 | 47 |
| 50 | 59 | 63 | 44 |
| 55 | 57 | | |
| 60 | 58 | | |
| 65 | 57 | | |
| 70 | 58 | | |
| 75 | 57 | | |
| 80 | 59 | | |

Example 5

Stability of Ce—Pd-MOR for Nitric Acid Exhaust Gas Conditions

Figure 5:
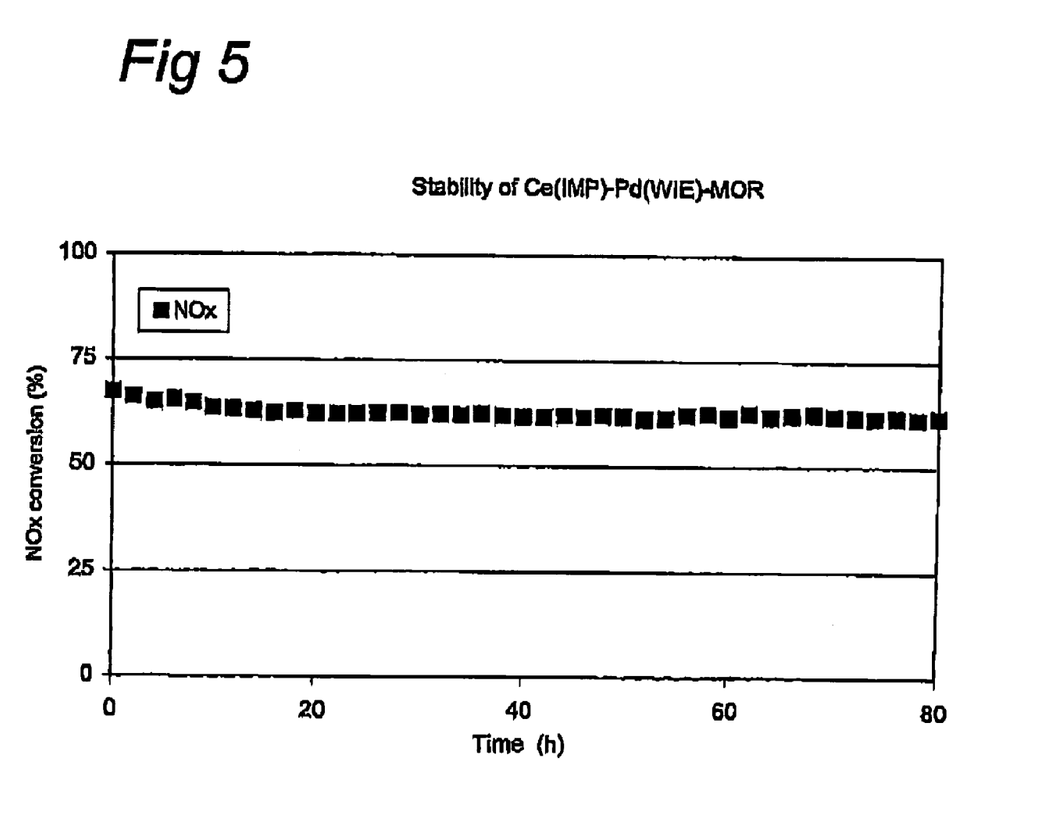
FIG. 5: $NO_x$ conversions over cerium-palladium loaded mordenite (catalyst 2) with methane as a function of time at 350° C. and with a gas stream that is characteristic of the emissions of a nitric acid factory.

In this example catalyst 2 is used to remove $NO_x$ from a gas composition such as to be found in the outlet gases from a nitric acid factory. The conditions are given in Table 7 and the results in Table 8 and in FIG. 5.

TABLE 7 test conditions for Example 5

| | |
|---|---|
| Volume | 15 ml |
| Flow | 5 l/min |
| GHSV | 20000 $h^{-1}$ |
| P | 4 bara |
| Gas composition: | |
| $N_2O$ | 1500 ppm |
| NO | 500 ppm |
| $CH_4$ | 2500 ppm |
| $H_2O$ | 0.5% |
| $O_2$ | 2.5% |
| $N_2$ | balance |

TABLE 7 conversion results from Example 5 at 350° C.
(see also FIG. 5)

| Time (h) | $NO_x$ (%) | Time (h) | $NO_x$ (%) | Time (h) | $NO_x$ (%) |
|---|---|---|---|---|---|
| 0 | 67 | 34 | 62 | 68 | 63 |
| 2 | 66 | 36 | 62 | 70 | 62 |
| 4 | 65 | 38 | 62 | 72 | 62 |
| 6 | 66 | 40 | 62 | 74 | 61 |
| 8 | 65 | 42 | 62 | 76 | 62 |
| 10 | 64 | 44 | 62 | 78 | 61 |
| 12 | 63 | 46 | 62 | 80 | 62 |
| 14 | 63 | 48 | 62 | 82 | 62 |
| 16 | 62 | 50 | 62 | 84 | 62 |
| 18 | 63 | 52 | 61 | 86 | 62 |
| 20 | 62 | 54 | 62 | 88 | 61 |
| 22 | 62 | 56 | 62 | 90 | 61 |
| 24 | 62 | 58 | 63 | 92 | 62 |
| 26 | 63 | 60 | 62 | 94 | 61 |
| 28 | 63 | 62 | 63 | 96 | 61 |
| 30 | 62 | 64 | 62 | 98 | 61 |
| 32 | 62 | 66 | 62 | | |

From these results (Table 8, FIG. 5) it is apparent that the catalyst retains its activity for a long time at 350° C. in the presence of 0.5% water (and 2.5% oxygen) and 1500 ppm $N_2O$.

Example 6

Combined $NO_x$-$N_2O$ Removal

In this example a combined $deNO_x$-$deN_2O$ setup is used, as described in NL-A-1017245, and in which the first catalyst is now catalyst 2 and the second catalyst is catalyst 6. Methane is used as reduction gas. The reaction conditions are given in Table 8, and are as in outlet gases from a nitric acid factory. The test results are shown in Table 9 and are also given in FIG. 6. From the results it is apparent that good $NO_x$ and $N_2O$ conversions can be achieved at relatively low temperatures. Even better conversions are achieved at pressures higher than 1 bara (FIG. 6a: $N_2O$ conversion at 1 and 6 bara; FIG. 6b: $NO_x$ conversion at 1 and 4 bara).

TABLE 8 test conditions for Example 6

|  | Cat 2 | Cat 6 |
|---|---|---|
| Volume | 15 ml | 15 ml |
| Flow | 5 l/min | |
| GHSV | 20000 h$^{-1}$ | |
| P | 1 and 4 bara | |
| Gas composition: | | |
| $N_2O$ | 1500 ppm | |
| NO | 500 ppm | |
| $CH_4$ | 2500 ppm | |
| $H_2O$ | 0.5% | |
| $O_2$ | 2.5% | |
| $N_2$ | balance | |

TABLE 9

Figure 6A:
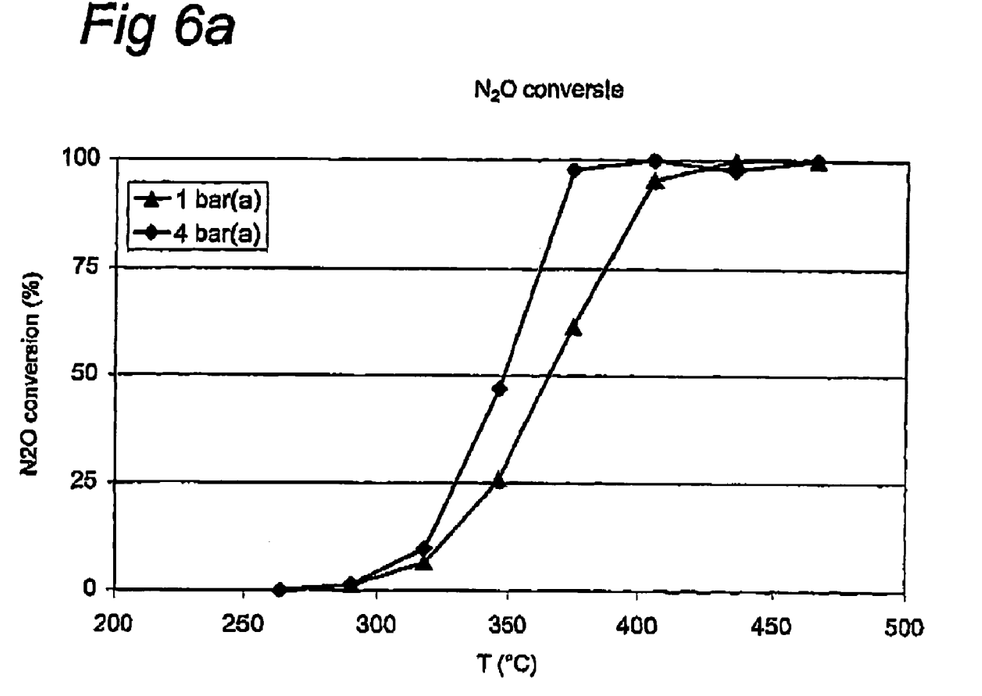
FIG. 6a depicts $N_2O$ conversion at 1 and 6 bara.
Figure 6B:
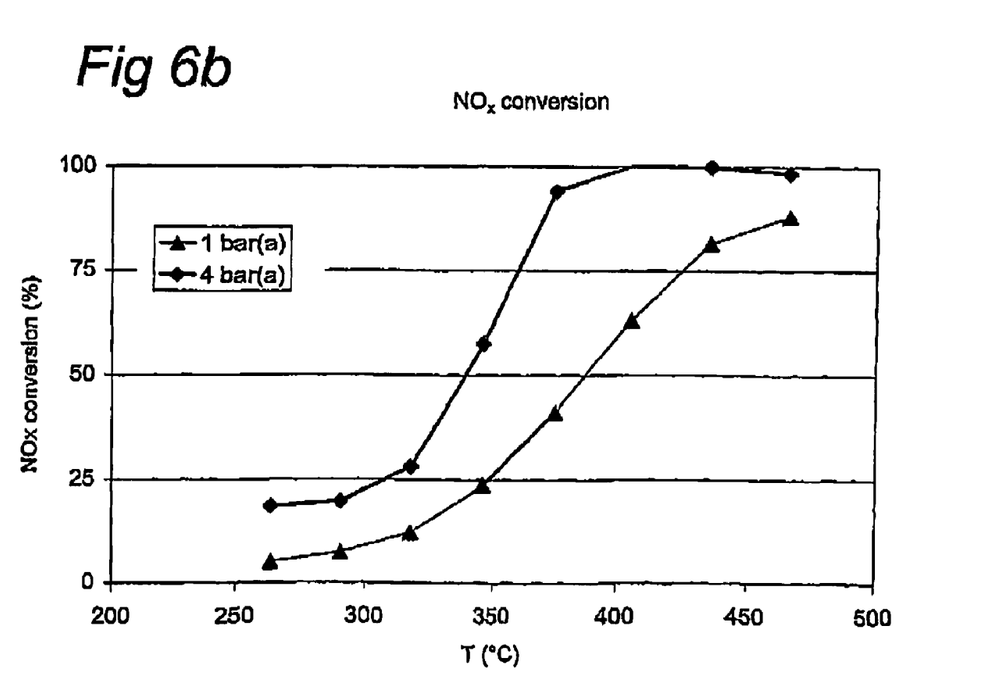
FIG. 6b depicts $NO_x$ conversion at 1 and 4 bara.

$NO_x$ and $N_2O$ conversion results from Example 6 (see also FIG. 6a & 6b)

| | 1 bara | | 4 bara | |
|---|---|---|---|---|
| T (° C.) | $N_2O$ (%) | $NO_x$ (%) | $N_2O$ (%) | $NO_x$ (%) |
| 263 | 0 | 5 | 0 | 19 |
| 290 | 1 | 7 | 1 | 20 |
| 318 | 7 | 12 | 10 | 28 |
| 346 | 26 | 24 | 47 | 57 |
| 375 | 61 | 41 | 98 | 94 |
| 405 | 95 | 63 | 100 | 100 |
| 436 | 100 | 82 | 98 | 100 |
| 466 | 100 | 88 | 100 | 99 |

Example 7

Conversion of $NO_x$ and CH4 and Stability of Y—Pd-MOR

Catalyst 8 was measured for evaluation of the conversion and stability, under the test conditions as given in Tables 10 and 12, respectively. The results obtained are given in tables 11 and 13, respectively.

TABLE 10 test conditions for Example 7 (conversion)
Example $CH_4$-SCR: performance yttrium—Pd-MOR

| Volume | 0.45 ml |
|---|---|
| Flow | 100 ml/min |
| GHSV | 13500 h$^{-1}$ |
| P | 1 bara |
| Gas composition | |
| NO | 500 ppm |
| $CH_4$ | 2500 ppm |
| $H_2O$ | 5% |
| $O_2$ | 5% |
| $N_2$ | bal. |

TABLE 11 conversion results for Pr—Pd-MOR (Cat 8)

| | Yttrium—Pd-MOR | |
|---|---|---|
| T (° C.) | $CH_4$ % | $NO_x$ % |
| 260 | 0 | 0 |
| 281 | 0 | 0 |
| 302 | 0 | 0 |
| 322 | 0 | 0 |
| 342 | 1 | 3 |
| 362 | 2 | 5 |
| 382 | 3 | 13 |
| 392 | 3 | 18 |
| 412 | 4 | 27 |
| 433 | 9 | 50 |
| 453 | 22 | 85 |
| 473 | 55 | 98 |
| 490 | 89 | 100 |

TABLE 12 test conditions for Example 7 (stability)
Example $CH_4$-SCR: performance yttrium—Pd-MOR

| Volume | 0.9 ml |
|---|---|
| Flow | 100 ml/min |
| GHSV | 7000 h$^{-1}$ |
| T | 395 ° C. |
| P | 1 bara |
| Gas composition | |
| NO | 500 ppm |
| $CH_4$ | 2500 ppm |
| $H_2O$ | 10.5% |
| $O_2$ | 5% |
| $N_2$ | bal. |

TABLE 13

Performance for Y—Pd-MOR (Cat 8):
conversion at 400° C. as a function of time

T 400° C.; 7.000 h$^{-1}$

| | Conversion (%) | |
|---|---|---|
| Time (h) | $CH_4$ | $NO_x$ |
| 2 | 10 | 58 |
| 100 | 9 | 53 |
| 150 | 10 | 54 |
| 200 | 10 | 55 |
| 250 | 9 | 54 |
| 300 | 11 | 56 |
| 350 | 9 | 54 |
| 400 | 10 | 55 |
| 450 | 11 | 52 |

Yttrium (yttria) improves the SCR activity of palladium-MOR resulting to higher $NO_x$ conversion level as compared to palladium. Yttrium (yttria) stabilizes Pd-MOR, even in the presence of over 10% water in the feed.

Example 8

Stability of Pr—Pd-MOR

Catalyst 7 was measured for evaluation of the stability, under the test conditions as given in Table 14. The results obtained are given in Table 15.

TABLE 14 test conditions for Example 8 (Stability)
Example $CH_4$-SCR: Stability Praseodymium—Pd-MOR

| | |
|---|---|
| Volume | 0.7 ml |
| Flow | 100 ml/min |
| GHSV | 9.000 h$^{-1}$ |
| T | 420 deg C. |
| P | 1 bara |
| Gas composition | |
| NO | 500 ppm |
| $CH_4$ | 2500 ppm |
| $H_2O$ | 5% |
| $O_2$ | 5% |
| $N_2$ | bal. |

TABLE 15

Performance for Pr—Pd-MOR (Cat 7):
conversion at 420° C. as a function of time

| T 420° C.; 9.000 h$^{-1}$ | Conversion (%) | |
|---|---|---|
| Time (h) | $CH_4$ | $NO_x$ |
| 2 | 11 | 59 |
| 10 | 14 | 60 |
| 23 | 14 | 63 |
| 80 | 14 | 65 |
| 85 | 15 | 64 |

Praseodymium improves the SCR activity of palladium-MOR resulting in a higher $NO_x$ conversion level as compared to palladium alone. Praseodymium stabilizes Pd-MOR and shows no signs of deactivation for the period of the test (85 hour).

Example 9

Conversion of $NO_x$ and $CH_4$ on a Number of Palladium Exchanged Mordenites

A number of palladium exchanged mordenites were measured for evaluation of the conversion, under the test conditions as given in Table 16. The results obtained are given in Table 17. The lanthanum (La), dysprosium (Dy) and gadolinium (Gd) Pd-mordenites were prepared in the same way as described for Cat 7 and 8.

TABLE 16 test conditions for Example 9 (conversion)
Example $CH_4$-SCR: performance Lanthanides-Pd-MOR

| | |
|---|---|
| Volume | 0.45 ml |
| Flow | 100 ml/min |
| GHSV | 13500 h$^{-1}$ |
| P | 1 bara |
| Gas composition | |
| NO | 500 ppm |
| $CH_4$ | 2500 ppm |
| $H_2O$ | 5% |
| $O_2$ | 5% |
| $N_2$ | bal. |

TABLE 17 conversion of $NO_x$ and $CH_4$ on Pd-exchanged mordenites

| | Pd-MOR | | Pr—Pd-MOR | | Tb—Pd-MOR | | La—Pd-MOR | | Dy—Pd-MOR | | Gd—Pd-MOR | |
|---|---|---|---|---|---|---|---|---|---|---|---|---|
| T (° C.) | $CH_4$ % | $NO_x$ % | $CH_4$ % | $NO_x$ % | $CH_4$ % | $NO_x$ % | $CH_4$ % | $NO_x$ % | $CH_4$ % | $NO_x$ % | $CH_4$ % | $NO_x$ % |
| 259 | 0 | 0 | 0 | 0 | nd | nd | 0 | 0 | 0 | 0 | 0 | 0 |
| 269 | 0 | 0 | 0 | 0 | nd | nd | 0 | 0 | 0 | 0 | 0 | 0 |
| 279 | 0 | 0 | 0 | 0 | nd | nd | 0 | 0 | 0 | 0 | 0 | 0 |
| 288 | 0 | 0 | 0 | 0 | nd | nd | 0 | 0 | 0 | 0 | 0 | 0 |
| 298 | 0 | 0 | 0 | 0 | 0 | 0 | 0 | 0 | 0 | 0 | 0 | 0 |
| 308 | 0 | 0 | 0 | 0 | 0 | 0 | 0 | 0 | 0 | 0 | 0 | 0 |
| 318 | 0 | 0 | 0 | 0 | 0 | 0 | 1 | 0 | 0 | 0 | 0 | 0 |
| 328 | 0 | 0 | 0 | 0 | 0 | 0 | 1 | 4 | 1 | 1 | 2 | 4 |
| 338 | 2 | 7 | 2 | 9 | 0 | 0 | 2 | 9 | 2 | 5 | 3 | 3 |
| 348 | 1 | 8 | 2 | 11 | 0 | 0 | 3 | 9 | 2 | 2 | 3 | 5 |
| 357 | 3 | 8 | 3 | 10 | 0 | 4 | 3 | 11 | 2 | 6 | 5 | 6 |
| 367 | 8 | 11 | 4 | 11 | 1 | 5 | 3 | 13 | 2 | 9 | 4 | 8 |
| 377 | 5 | 13 | 4 | 12 | 1 | 8 | 3 | 15 | 3 | 11 | 4 | 11 |
| 387 | 5 | 15 | 3 | 14 | 4 | 8 | 3 | 18 | 2 | 10 | 3 | 13 |
| 397 | 4 | 17 | 6 | 15 | 5 | 14 | 4 | 21 | 4 | 16 | 4 | 14 |
| 406 | 5 | 21 | 7 | 22 | 5 | 15 | 5 | 25 | 4 | 21 | 6 | 17 |
| 416 | 7 | 23 | 10 | 24 | 4 | 17 | 7 | 29 | 7 | 26 | 4 | 17 |
| 426 | 9 | 25 | 8 | 27 | 5 | 20 | 8 | 37 | 7 | 35 | 8 | 22 |
| 436 | 17 | 30 | 11 | 38 | 7 | 24 | 12 | 48 | 10 | 50 | 10 | 29 |
| 445 | 21 | 41 | 14 | 66 | 11 | 37 | 18 | 57 | 16 | 67 | 16 | 48 |
| 455 | 29 | 54 | 27 | 82 | 15 | 53 | 27 | 71 | 24 | 87 | 22 | 75 |
| 464 | 45 | 70 | 42 | 100 | 24 | 81 | 42 | 80 | 39 | 94 | 36 | 90 |
| 474 | 72 | 79 | 59 | 100 | 35 | 99 | 68 | 86 | 59 | 97 | 54 | 99 |
| 483 | 94 | 79 | 77 | 100 | 53 | 100 | 94 | 89 | 78 | 97 | 72 | 97 |
| 493 | | | 90 | 100 | 72 | 100 | 100 | 86 | 93 | 99 | 93 | 100 |

Lanthanides improve the SCR activity of palladium-MOR resulting in higher $NO_x$ conversion levels as compared to palladium mordenite (ion exchanged) only.

Example 10

Conversion of $NO_x$ and $CH_4$ on a Physical Mixture of a Zeolite and an Oxide (Cat 9)

Cat 9 was measured for evaluation of the conversion, under the same test conditions as given in Table 16. The result obtained are given in Table 18.

TABLE 18 conversion results for Cat 9

| | $CeO_2$ + Yttrium—Pd-MOR | |
|---|---|---|
| T (° C.) | $CH_4$ % | $NO_x$ % |
| 260 | 0 | 0 |
| 281 | 0 | 0 |
| 302 | 0 | 0 |
| 318 | 5 | 19 |
| 338 | 8 | 45 |
| 362 | 15 | 72 |
| 377 | 20 | 88 |
| 387 | 22 | 92 |
| 407 | 26 | 94 |
| 427 | 33 | 99 |
| 456 | 50 | 99 |
| 475 | 67 | 99 |
| 495 | 91 | 99 |

Physical mixing of ceria and Y—Pd-CBV21a (1:3 w/w) gives a very high SCR activity.

Example 11

Conversion of $NO_x$ and $CH_4$ on BEA (Cat 10) Compared to ZSM-5 (Cat 11)

Ce—Pd-BEA (Ce IMP, Pd WIE) Cat 10 was measured for evaluation of the conversion in comparison to Ce—Pd-ZSM-5 (Ce IMP; Pd WIE) (Cat 11), under the same test conditions as given in Table 3. The results obtained are given in Table 19.

TABLE 19 conversion results for Ce—Pd-BEA (Ce IMP; Pd WIE) Cat 10 and Ce—Pd-ZSM-5 (Ce IMP; Pd WIE) (Cat 11)

| | cerium—Pd-ZSM-5 (10-ring) | | cerium—Pd-BEA (12-ring) | |
|---|---|---|---|---|
| T (° C.) | $CH_4$ % | $NO_x$ % | $CH_4$ % | $NO_x$ % |
| 276 | 0 | 0 | 0 | 0 |
| 295 | 0 | 0 | 0 | 0 |
| 315 | 0 | 0 | 0 | 0 |
| 334 | 1 | 6 | 1 | 8 |
| 353 | 3 | 9 | 4 | 14 |
| 372 | 4 | 15 | 5 | 17 |
| 391 | 5 | 22 | 7 | 24 |
| 410 | 10 | 26 | 12 | 30 |
| 430 | 15 | 32 | 18 | 35 |
| 450 | 22 | 33 | 24 | 49 |

Compared to Ce(IMP)-Pd(WIE)-ZSM-5 (10-ring zeolite), the Ce(IMP)-Pd(WIE)-BEA catalyst (12-ring zeolite) is more active for $NO_x$ SCR with methane.

Example 12

Conversion of $NO_x$ and $CH_4$ on Ce—Pd-ZSM-5 and Stability of Ce—Pd-ZSM-5 (Not According to the Invention)

Ce—Pd-ZSM-5 (Ce IMP; Pd WIE) Cat 11 was measured for evaluation of conversion and performance (stability), under the test conditions as given in Table 3 (with 19500 instead of 20000 $h^{-1}$) and table 21, respectively. The result obtained are given in Tables 20 and 22, respectively.

TABLE 20 conversion results for Ce—Pd-ZSM-5 (Ce IMP; Pd WIE) Cat 11

| | cerium—Pd-ZSM-5 | |
|---|---|---|
| T (° C.) | $CH_4$ % | $NO_x$ % |
| 199 | 0 | 0 |
| 219 | 0 | 0 |
| 238 | 0 | 0 |
| 257 | 0 | 0 |
| 276 | 0 | 0 |
| 295 | 0 | 0 |
| 315 | 0 | 0 |
| 334 | 1 | 6 |
| 353 | 3 | 9 |
| 372 | 4 | 15 |
| 391 | 5 | 22 |
| 410 | 10 | 26 |
| 430 | 16 | 32 |
| 450 | 22 | 33 |

TABLE 21 test conditions for Ce—Pd-ZSM-5 (Ce IMP; Pd WIE) Cat 11 (Stability)
Example $CH_4$-SCR: stability of Ce—Pd-ZSM-5 as a function of the temperature

| Volume | 0.45 ml |
|---|---|
| Flow | 150 ml/min |
| GHSV | 19.500 $h^{-1}$ |
| T | 450 ° C. |
| P | 1 bara |

TABLE 22 test results for Ce—Pd-ZSM-5 (Ce IMP; Pd WIE) Cat 11 (Stability)

| Time (h) | $CH_4$(%) | $NO_x$ (%) |
|---|---|---|
| 2 | 18 | 23 |
| 5 | 14 | 18 |
| 10 | 13 | 16 |
| 15 | 12 | 12 |
| 20 | 11 | 12 |
| 25 | 11 | 12 |
| 30 | 10 | 11 |
| 35 | 9 | 11 |
| 40 | 8 | 9 |
| 45 | 7 | 8 |
| 50 | 7 | 7 |

It appears that the Ce(IMP)-Pd(WIE)-ZSM5 catalyst is not very active compared to Ce—Pd-MOR and even deactivates with time.

Example 13

Conversion of Ce—Pd-FER (Not According to The Invention)

Ce—Pd-FER (Ce IMP; Pd WIE) Cat 12 was measured for evaluation of the conversion and performance (stability), under the test conditions as given in Table 10. The results obtained are given in Table 23.

TABLE 23 conversion of $NO_x$ and $CH_4$ on Ce—Pd-FER (Ce IMP; Pd WIE) Cat 12 cerium—Pd-FER (10/8 ring)

| T (° C.) | $CH_4$ % | $NO_2$ % | $NO_x$ % |
|---|---|---|---|
| 200 | 0 | 0 | 0 |
| 219 | 0 | 0 | 0 |
| 238 | 0 | 0 | 0 |
| 258 | 0 | 3 | 0 |
| 277 | 0 | 4 | 0 |
| 297 | 0 | 7 | 0 |
| 316 | 1 | 10 | 0 |
| 335 | 2 | 12 | 0 |
| 355 | 2 | 14 | 0 |
| 374 | 2 | 22 | 0 |
| 393 | 2 | 19 | 0 |
| 412 | 3 | 27 | 0 |
| 431 | 6 | 23 | 0 |

The Ce(IMP)-Pd(WIE)-FER catalyst is only active for the oxidation of NO to $NO_2$. However, $NO_x$ (including $NO_2$ that has been obtained after the conversion by this catalyst), is not reduced at all.

The invention claimed is:

1. A method for the catalytic reduction of $NO_x$ in an $NO_x$ containing gas by contacting said $NO_x$ containing gas with methane in the presence of a catalyst comprising a zeolite loaded with palladium and a metal selected from the group consisting of scandium, yttrium, a lanthanide and a combination thereof, said zeolite based on rings having 12 oxygen atoms, and wherein said zeolite is loaded with 0.02 to 2% by weight of palladium.

2. The method according to claim 1, wherein the zeolite is loaded with scandium, yttrium, a lanthanide or a combination thereof and optionally other metals after having been loaded with palladium by ion exchange.

3. The method according to claim 1, wherein the zeolite comprises a zeolite of the class of FAU, MOR, BEA, EMT, CON, BOG or ITQ-7.

4. The method according to claim 1, wherein the zeolite is loaded with scandium, yttrium, a lanthanide or a combination thereof by ion exchange or incipient wetness techniques.

5. The method according to claim 4, wherein the zeolite comprises 0.01 to 20% by weight of scandium, yttrium, a lanthanide or a combination thereof.

6. The method according to claim 1, wherein the zeolite comprises 0.01 to 20% by weight of scandium, yttrium, a lanthanide or a combination thereof.

7. The method according to claim 1, wherein the zeolite is further loaded with one or more metals from groups IIIa, IIIb, IVa, IVb, Vb, VIb, VIIb, and VIII of the periodic system.

8. The method according to claim 1, wherein the gas comprises oxygen, water or a combination thereof.

9. The method according to claim 1, wherein the gas comprises carbon monoxide.

10. The method according to claim 1, wherein the reaction temperature is between 30° C. and 600° C.

11. The method according to claim 1, wherein the $NO_x$/methane ratio is between 0.02 and 2.

12. A method for the catalytic reduction of $NO_x$ in an $NO_x$ containing gas by contacting said $NO_x$ containing gas with methane in the presence of a catalyst comprising a zeolite loaded with palladium and a metal selected from the group consisting of scandium, yttrium, a lanthanide and a combination thereof, said zeolite based on rings having 12 oxygen atoms, and wherein an additional catalyst is used for the removal of $N_2O$.

13. The method according to claim 12, wherein the additional catalyst for the removal of $N_2O$ is an iron-containing zeolite, a promoted iron-containing zeolite or a combination thereof.

14. A method for the catalytic reduction of $NO_x$ in an $NO_x$ containing gas by contacting said $NO_x$ containing gas with methane in the presence of a catalyst comprising a zeolite loaded with palladium and a metal selected from the group consisting of scandium, yttrium, a lanthanide and a combination thereof, said zeolite based on rings having 12 oxygen atoms, and wherein an additional catalyst is used for the removal of methane.

15. A method for the catalytic reduction of $NO_x$ in an $NO_x$ containing gas by contacting said $NO_x$ containing gas with methane in the presence of a catalyst comprising a zeolite loaded with palladium and a metal selected from the group consisting of scandium, yttrium, a lanthanide and a combination thereof, said zeolite based on rings having 12 oxygen atoms, wherein the zeolite is loaded with scandium, yttrium, a lanthanide or a combination thereof by physically mixing the zeolite with salts or oxides of said metals, and further wherein an additional catalyst is used for the removal of $N_2O$.

16. The method according to claim 15, wherein the zeolite is loaded with 0.01 to 50% by weight of scandium, yttrium, a lanthanide or a combination thereof.

17. The method according to claim 15, wherein the zeolite is further loaded with one or more metals from groups IIIa, IIIb, IVa, IVb, Vb, VIb, VIIb, and VIII of the periodic system.

18. The method according to claim 15, wherein the gas comprises oxygen, water or a combination thereof.

19. The method according to claim 15, wherein the gas comprises carbon monoxide.

20. The method according to claim 15, wherein the reaction temperature is between 300° C. and 600° C.

21. The method according to claim 15, wherein the $NO_x$/methane ratio is between 0.02 and 2.

22. The method according to claim 15, wherein the additional catalyst for the removal of $N_2O$ is an iron-containing zeolite, a promoted iron-containing zeolite or a combination thereof.

23. A method for the catalytic reduction of $NO_x$ in an $NO_x$ containing gas by contacting said $NO_x$ containing gas with methane in the presence of a catalyst comprising a zeolite loaded with palladium and a metal selected from the group consisting of scandium, yttrium, a lanthanide and a combination thereof, said zeolite based on rings having 12 oxygen atoms, wherein the zeolite is loaded with scandium, yttrium, a lanthanide or a combination thereof by physically mixing the zeolite with salts or oxides of said metals, and further wherein an additional catalyst is used for the removal of methane.

24. A catalyst comprising a zeolite loaded with palladium and a metal selected from the group consisting of scandium, yttrium, a lanthanide and a combination thereof, said zeolite based on rings having 12 oxygen atoms, wherein the palladium in the zeolite is wholly or partially coordinated as ion by the zeolite, and wherein said zeolite is loaded with 0.02 to 2% by weight of palladium.

25. The catalyst according to claim 24, having an infra-red sensitive zeolite lattice vibration visible at about 950 cm$^{-1}$.

26. The catalyst according to claim 24, wherein the zeolite comprises a zeolite of the class of FAU, MOR, BEA, EMT, CON, BOG or ITQ-7.

27. The catalyst according to claim 24, wherein the zeolite comprises 0.01 to 20% by weight of scandium, yttrium, a lanthanide or a combination thereof.

28. The catalyst according to claim 24, wherein the zeolite is further loaded with one or more metals from groups IIIa, IIIb, IVa, IVb, Vb, VIb, VIIb, and VIII of the periodic system.

29. A method for the preparation of a zeolite loaded with palladium and a metal selected from the group consisting of scandium, yttrium, a lanthanide and a combination thereof, said zeolite based on rings having 12 oxygen atoms, wherein the zeolite is loaded with scandium, yttrium, a lanthanide or a combination thereof and optionally other metals after having been loaded with palladium by ion exchange.

30. The method according to claim 29, wherein the zeolite comprises a zeolite of the class of FAU, MOR, BEA, EMT, CON, BOG or ITQ-7.

31. The method according to claim 29, wherein the zeolite is loaded with 0.02 to 2% by weight of palladium.

32. The method according to claim 29, wherein the zeolite is loaded with scandium, yttrium, a lanthanide or a combination thereof by ion exchange or incipient wetness techniques.

33. The method according to claim 32, wherein the zeolite comprises 0.01 to 20% by weight of scandium, yttrium, a lanthanide or a combination thereof.

34. The method according to claim 29, wherein the zeolite comprises 0.01 to 20% by weight of scandium, yttrium, a lanthanide or a combination thereof.

35. The method according to claim 29, wherein the zeolite, after having been loaded with palladium by ion exchange, the zeolite is loaded with one or more metals from groups IIIa, IIIb, IVa, IVb, Vb, VIb, VIIb, and VIII of the periodic system, before, at the same time or after the introduction of scandium, yttrium or a lanthanide or a combination thereof.

36. The method according to claim 29, wherein the metal is yttrium.

37. A method for the catalytic reduction of $NO_x$ in an $NO_x$ containing gas by contacting said $NO_x$ containing gas with methane in the presence of a catalyst comprising a zeolite loaded with palladium and yttrium, wherein said zeolite is based on rings having 12 oxygen atoms.

38. A method for the catalytic reduction of $NO_x$ in an $NO_x$ containing gas by contacting said $NO_x$ containing gas with methane in the presence of a catalyst comprising a zeolite loaded with palladium and yttrium, wherein said zeolite based on rings having 12 oxygen atoms, and said zeolite is loaded with yttrium by physically mixing the zeolite with salts or oxides of yttrium.

39. A catalyst comprising a zeolite loaded with palladium and yttrium, said zeolite based on rings having 12 oxygen atoms, wherein the palladium in the zeolite is wholly or partially coordinated as ion by the zeolite.

* * * * *